(12) United States Patent
Concini et al.

(10) Patent No.: US 8,943,196 B2
(45) Date of Patent: *Jan. 27, 2015

(54) PROGRAMMATICALLY DETERMINING AN EXECUTION MODE FOR A REQUEST DISPATCH UTILIZING HISTORIC METRICS

(75) Inventors: Michael E. Concini, Cary, NC (US); Curtiss J. Howard, Raleigh, NC (US); Stephen J. Kenna, Cary, NC (US); Maxim A. Moldenhauer, Durham, NC (US); Seth R. Peterson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,957

(22) Filed: Aug. 1, 2012

(65) Prior Publication Data

US 2012/0304177 A1 Nov. 29, 2012

Related U.S. Application Data (63) Continuation of application No. 12/715,139, filed on Mar. 1, 2010, now Pat. No. 8,296,411.

(51) Int. Cl.
*G06F 15/173* (2006.01)
*G06F 9/54* (2006.01)
*G06F 9/50* (2006.01)

(52) U.S. Cl.
CPC .............. *G06F 9/547* (2013.01); *G06F 9/5027* (2013.01); *H01L 47/78* (2013.01)
USPC ............ 709/224; 709/203; 709/223; 709/226

(58) Field of Classification Search
USPC ................. 709/203, 220, 223, 224, 226, 228; 712/221, 229; 718/100, 104
See application file for complete search history.

(56) References Cited

U.S. PATENT DOCUMENTS 5,301,331 A * 4/1994 Ueno et al. ............... 710/260
5,675,771 A * 10/1997 Curley et al. ............. 703/23
(Continued)

FOREIGN PATENT DOCUMENTS

CN 1734427 A 2/2006
WO 03032181 4/2003

OTHER PUBLICATIONS

"Asynchronous request dispatcher application design considerations," [online] WebSphere Application Server—Express, Version 70, International Business Machines Corporation, [retrieved Mar. 1, 2010] retrieved from the Internet: <http://publib.boulder.ibm.com/infocenter/wasinfo/v7r0/index.jsp?topic=/com.ibm.websphere.express.doc/info/exp/ae/rweb_ard_considerations.html>.

(Continued)

*Primary Examiner* — Ramy M Osman
(74) *Attorney, Agent, or Firm* — Patents on Demand P.A.; Brian K. Buchheit; Scott M. Garrett (57) ABSTRACT

A request dispatcher can automatically switch between processing request dispatches in a synchronous mode and an asynchronous mode. Each dispatch can be associated with a unique identification value such as a process ID or Uniform Resource Identifier (URI), historic metrics, and a ruleset. With each execution of the request dispatch, historic metrics can be collected. Metrics can include, but is not limited to, execution duration and/or execution frequency, processor load, memory usage, network input/output, number of dependent dispatches, and the like. Utilizing historic metrics, rules can be constructed for determining which mode to execute the subsequent execution of the dispatch. As such, runtime optimization of Web applications can be further improved.

16 Claims, 4 Drawing Sheets

(56) References Cited

U.S. PATENT DOCUMENTS

| | | | | |
|---|---|---|---|---|
| 5,812,768 | A * | 9/1998 | Page et al. | 709/228 |
| 6,401,005 | B1 * | 6/2002 | Schwarz et al. | 700/159 |
| 7,099,935 | B2 * | 8/2006 | Jordan et al. | 709/223 |
| 7,499,971 | B1 * | 3/2009 | Chandran | 709/203 |
| 7,809,988 | B1 * | 10/2010 | Portal et al. | 714/38.13 |
| 8,037,122 | B2 * | 10/2011 | Saha et al. | 709/223 |
| 8,131,580 | B2 * | 3/2012 | Doshi et al. | 705/7.31 |
| 8,271,767 | B2 * | 9/2012 | Mera et al. | 712/221 |
| 2002/0032692 | A1 * | 3/2002 | Suzuki et al. | 707/200 |
| 2002/0062369 | A1 * | 5/2002 | von Klopp et al. | 709/224 |
| 2002/0184165 | A1 * | 12/2002 | Deboer et al. | 706/1 |
| 2003/0014551 | A1 * | 1/2003 | Ishibashi et al. | 709/310 |
| 2004/0015762 | A1 | 1/2004 | Klotz et al. | |
| 2004/0172618 | A1 * | 9/2004 | Marvin | 719/328 |
| 2006/0026214 | A1 * | 2/2006 | Berg et al. | 707/201 |
| 2006/0031462 | A1 | 2/2006 | Xing et al. | |
| 2006/0041662 | A1 * | 2/2006 | Georgiev et al. | 709/226 |
| 2007/0011330 | A1 * | 1/2007 | Dinker et al. | 709/226 |
| 2008/0016151 | A1 | 1/2008 | Howard et al. | |
| 2008/0086358 | A1 * | 4/2008 | Doshi et al. | 705/10 |
| 2008/0104025 | A1 * | 5/2008 | Dharamshi et al. | 707/3 |
| 2008/0168130 | A1 | 7/2008 | Chen et al. | |
| 2009/0006821 | A1 * | 1/2009 | Mera et al. | 712/221 |
| 2009/0063618 | A1 | 3/2009 | Chetuparambil et al. | |
| 2009/0064182 | A1 * | 3/2009 | Holar et al. | 719/314 |
| 2009/0144707 | A1 | 6/2009 | Goff et al. | |
| 2011/0252262 | A1 * | 10/2011 | Yoshihara et al. | 713/375 |

OTHER PUBLICATIONS

"Developing Web Applications, Servlets, and JSPs for WebLogic Server," [online] BEA Systems, 2010, [retrieved Mar. 1, 2010] retrieved from the Internet: <http://download.oracle.com/docs/cd/E11035_01/wls100/webapp/progservlet.html>.

"Asynchronous Support in Servlet 3.0". Rajiv Mordani, Nov. 30, 2009, http://blogs.oracle.com/enterprisetechtips/entry/asynchronours_support_in_servlet_3.

"Asynchronous processing support in servlet 3.0". Xinyu Liu, Feb. 19, 2009, http://www.javaworld.com/javaworld/jw-02-2009/jw-servlet3.html.

* cited by examiner

Executable Code 210

```
import com.ibm.Websphere.WebContainer.RequestDispatcher;   ~212
import javax.servlet.ServletException;
import javax.servlet.http.HttpServlet;
import javax.servlet.http.HttpServletRequest;
import javax.servlet.http.HttpServletResponse;
   •
   •
   •
RequestDispatcher rd = ServletRequest.getRequestDispatcher(String path)
rd.include(request, response, auto, 500ms );
                                        214
```

PROGRAMMATICALLY DETERMINING AN EXECUTION MODE FOR A REQUEST DISPATCH UTILIZING HISTORIC METRICS

CROSS-REFERENCE TO RELATED APPLICATION

This application is a continuation of U.S. patent application Ser. No. 12/715,139, filed Mar. 1, 2010 (pending), which is incorporated herein in its entirety.

BACKGROUND

The disclosure relates to the field of middleware and, more particularly, to programmatically determining an execution mode for a request dispatch utilizing historic metrics.

When an application server processes executable code, such as a Web application (e.g., JAVA Servlet or a JAVA SERVER PAGE), there can be one or more request dispatches present within the Web application. These request dispatches are typically denoted by an include( ) function call specifying a resource to execute, such as another servlet or JAVA SERVER PAGE (JSP). The specified resource can be executed in one of two modes, asynchronously or synchronously. Synchronous execution often results in the executable code blocking (e.g., suspended) until the specified resource execution is complete, a situation which in many instances is unfavorable. Further, the resource can include additional request dispatches, which can execute other resources resulting in an execution chain that frequently introduces significant latency to the Web application. As such, several disadvantages can arise as a result of this latency, which can include unresponsive applications and/or excessive server load.

One solution to overcome these disadvantages is utilizing an asynchronous execution mode for the specified resource. However, asynchronous execution introduces overhead, such as establishing a new thread, placing markers in the output, and replacing markers for server or client side aggregation. In many instances, this overhead can compound latency which can significantly reduce performance gains offered by asynchronous execution. For instance, synchronous execution of a resource can result in 10 ms latency, where executing the same resource asynchronously can result in 20 ms latency due to the overhead introduced by the asynchronous execution (e.g., thread setup costs).

Further, in dynamic server environments, synchronous and asynchronous resource execution can have varying results due to changes in resource availability. Since Web applications are commonly deployed in these environments, the Web applications are subject to fluctuating performances. To address these problems, Web developers often make educated guesses about which execution mode can yield the best performance results. Often times, these guesses do not result in the most optimal application performance. As such, many server environments executing Web applications can suffer from inefficient resource usage and reduced server capability which can unduly burden an information technology (IT) infrastructure.

BRIEF SUMMARY

One embodiment of the disclosure includes a method for dispatching a request. In the method, a request dispatch to be executed within a first executable code during execution time can be identified. The request dispatch can be associated with a unique identification value. The unique identification value of the request dispatch can identify a second executable code to be executed. The first and second executable code can reside within a component of a Web container. The Web container can utilize any of a variety of technologies that permit the including of resources. For example, the Web container can be associated with a runtime environment, such as a J2EE runtime environment. Prior to execution of the second executable code, an execution mode for the second executable code can be determined. This determination can involve evaluating at least one of a performance metric and a threshold value. The threshold value can be at least one of a user established value and a programmatically established value. The execution mode can be an asynchronous execution mode or a synchronous execution mode. Responsive to the determining of the execution mode, the request dispatch can be executed based on using the determined execution mode. The synchronous execution mode can result in the first executable code executing and completing execution before execution of the second executable code begins. The asynchronous execution mode can result in the first and second executable code to be executed simultaneously.

Another embodiment of the disclosure can include a system for dispatching a request. The system can include a dispatch engine able to identify and execute a request dispatch associated with a first executable code. The dispatch engine can be a component of a transport channel chain within a runtime environment. The transport channel chain can be associated with a transport layer of an Open System Interconnect (OSI) layer model. The runtime environment can be any environment supporting an inclusion of resources. For example and in one embodiment, the runtime environment can be a JAVA 2 ENTERPRISE EDITION (J2EE) runtime environment. The system can also include a request dispatch associated with the first executable code. The request dispatch can be associated with a unique identification value. The unique identification value can identify a unique resource to be executed. The request dispatch can trigger the execution of the unique resource. The unique resource can include a second executable code. The system can also include at least one performance metric that is associated with the request dispatch. The performance metric can be automatically collected during the request dispatch execution. The performance metric can be utilized to modify the execution behavior of the request dispatch. A ruleset can exist that is configured to establish at least one of a threshold value, an execution mode, and an event handler associated with the request dispatch. The threshold value can be a user established setting or an automatically determined value. The execution mode can be a synchronous execution mode or an asynchronous execution mode. The synchronous execution mode can result in the first executable code executing sequentially with the second executable code, where the second executable code is not permitted to execute until the first executable code completes its execution. The asynchronous execution mode can result in the first and second executable code running simultaneously.

DETAILED DESCRIPTION

The disclosure provides a solution for programmatically determining a request dispatch execution mode during runtime utilizing historic metrics. That is, a request dispatcher can automatically and intelligently switch between processing request dispatches (e.g., include( )) in a synchronous mode and an asynchronous mode. Each request dispatch can be associated with a unique identification value such as a process ID or Uniform Resource Identifier (URI), historic metrics, and a ruleset. With each execution of the request dispatch, historic metrics can be collected. Metrics can include, but are not limited to, execution duration and/or execution frequency, processor load, memory usage, network input/output, number of dependent request dispatches, and the like. Utilizing historic metrics, rules can be constructed for determining which mode to execute the subsequent execution of the request dispatch. For instance, when the synchronous execution duration (e.g., 100 ms) of a request dispatch exceeds a user specified duration (e.g., 50 ms), the subsequent execution of the request dispatch can be executed in asynchronous mode. The rules associated with the request dispatch can be one or more arbitrarily complex rules for determining an appropriate execution mode. As such, runtime optimization of Web applications can be further improved.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

The computer-readable medium can be a non-transitory storage medium in which data is retained in a digitally encoded form. The computer-readable medium can be a physical, tangible storage medium able to retain information, which is extractable by computing equipment to obtain the data content that was stored upon the storage medium.

Computer program code for carrying out operations of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
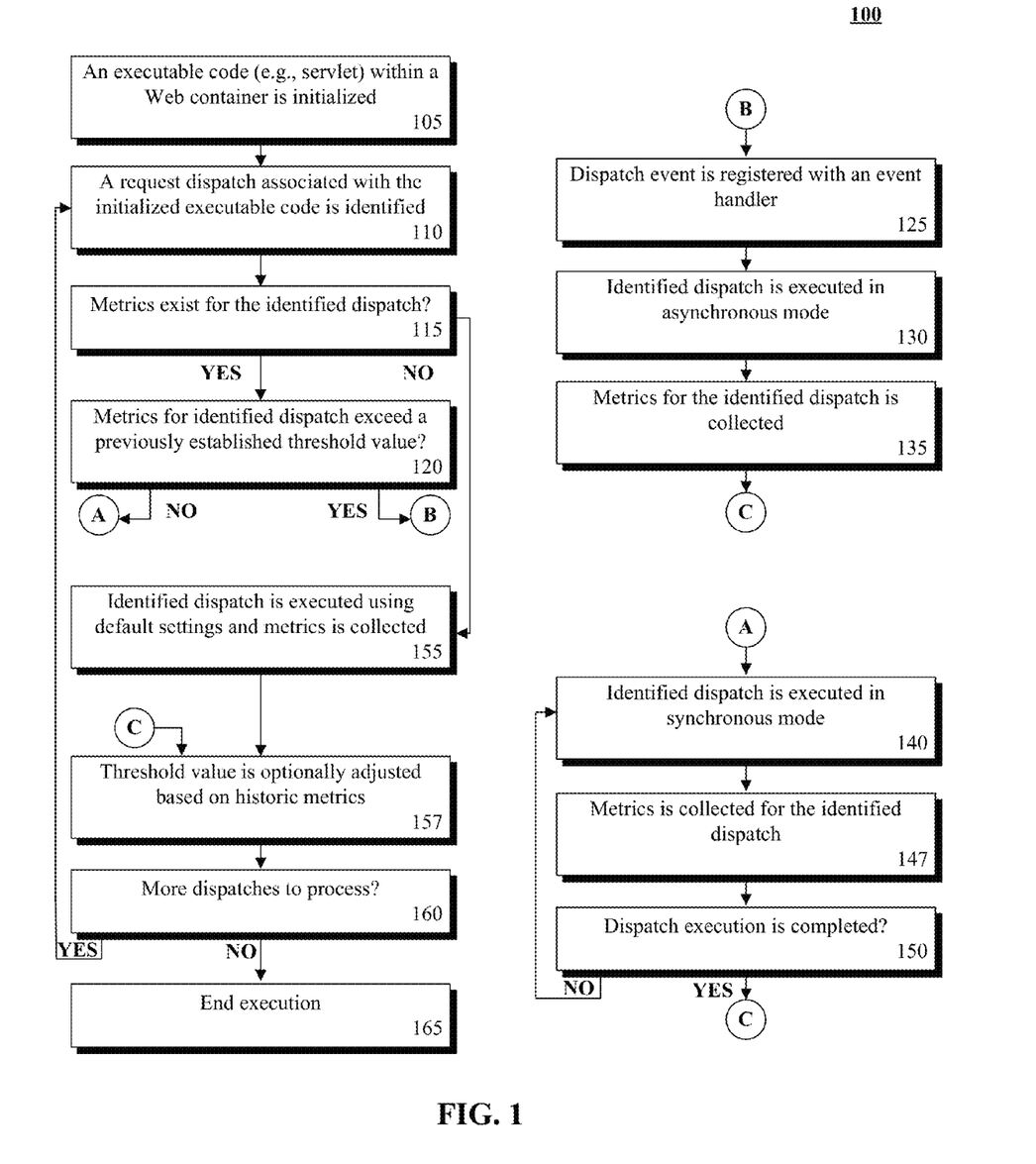
FIG. 1 is a flowchart diagram illustrating a method programmatically determining an execution mode for a request dispatch utilizing historic metrics in accordance to an embodiment of inventive arrangements disclosed herein.

FIG. 1 is a flowchart illustrating a method 100 for programmatically determining an execution mode for a request dispatch utilizing historic metrics in accordance to an embodiment of inventive arrangements disclosed herein. In method 100, a request dispatch associated with an identified executable code (e.g., JAVA servlet) executing within an application server (e.g., JAVA 2 ENTERPRISE EDITION application server) can be automatically executed in a machine determined manner. Utilizing historic metrics, the request dispatch determination can be performed during runtime to identify an execution mode: asynchronous or synchronous. Executable code can be one or more components of a Web application including, but not limited to, servlets, JAVA server pages, JAVA beans, JAVA classes, portlets, and the like. For instance, executable code can be a JAVA web application providing dynamic web content.

Method 100 can be performed within the context of any number of suitable systems, such as system 300. Throughout the disclosure, for clarity of expression and convenience, JAVA based implementation examples have been provided. Scope of the disclosure is not limited in this regard, and inventive arrangements detailed herein can be implemented using any of a variety of technologies (including non-JAVA ones) so long as the implementation technologies support the inclusion of resources. For example, in one embodiment .NET technologies can be utilized when determining an execution mode for a request dispatch using historic metrics, as detailed herein.

As used herein, request dispatch can include programmatic commands permitting the execution of a developer specified resource. In one embodiment (e.g., a JAVA based one) the request dispatch can be a JAVA Application Programming Interface (API) method such as include( ) and forward( ). The request dispatch can be uniquely identified utilizing one or more identification mechanisms including, but not limited to, process ID, automated/manual code annotation, tagging, Uniform Resource Locator (URL) identification, unique path identification, unique query string, and the like. Each request dispatch can be associated with one or more historic metrics and execution mode settings enabling optimized request dispatching based on application server performance.

In step 105, an executable code within a Web container is initialized. The executable code can be a Web application executing within the Web container. The Web container can be one or more constructs executing within a JAVA 2 ENTERPRISE EDITION (J2EE) application server, such as a JAVA VIRTUAL MACHINE (JVM). Other servers, such as a .NET server, can be utilized instead of the J2EE application server depending on implementation choices and a target implementation environment in which method 100 is performed. In step 110, a request dispatch associated with the initialized executable code is identified. The identified dispatch can be associated with one or more resources to be executed. The resources can be one or more executable code objects, such as servlets, one or more JAVA SERVER PAGE (JSP) Web pages, and the like. In step 115, if metrics exist for the identified dispatch, the method can continue to step 120, else proceed to step 155. Metrics associated with the identified dispatch can be one or more historic metrics. Metrics can include, but are not limited to, execution duration and/or execution frequency, complexity, processor load, memory usage, network input/output, number of dependent identified dispatches, and the like. For instance, metrics can include the average execution duration of the identified dispatch over a determined period of time. Further, metrics for each execution mode of an identified dispatch can be tracked enabling optimum decision making functionality. That is, an evaluation of metrics for an asynchronous execution mode and synchronous execution mode can be performed to establish default settings for a Web application.

In step 120, if historic metrics for the identified dispatch exceeds a previously established threshold value, the method can continue to step 125, else proceed to step 140. For instance, the threshold value can be a timing value such as an execution duration. In one embodiment, historic execution time and threshold values can be numerically compared to determine which mode to execute the identified dispatch. In instances where a threshold value is absent, the identified dispatch can be executed using a "best guess" approach. For example, by analyzing similar dispatches, a threshold value can be programmatically derived permitting intelligent execution of the identified dispatch. In step 125, a dispatch event is registered with an event handler. In step 130, the identified dispatch is executed in asynchronous mode which can include non-blocking code execution. That is, the Web application can continue to execute simultaneously with the identified dispatch. In step 135, metrics for the identified dispatch can be collected. Metrics can be collected utilizing one or more metric collection components, such as performance monitoring agents. Performance monitoring agents can include, but are not limited to, load monitors, executable code optimization tools, and the like.

In step 140, the identified dispatch can be executed in synchronous mode. In step 147, metrics can be collected for the identified dispatch. In step 145, metric data can be collected for the identified dispatch. In one embodiment metric data can include the blocking duration of the identified dispatch. In step 150, if the identified dispatch execution is completed, the method can continue to step 157, else the method can return to step 140.

In step 155, identified dispatch is executed using default settings and metrics associated with the dispatch can be collected. In step 157, the threshold value can be optionally modified based on historic metrics. For instance modification can include increasing/decreasing threshold values over time. That is, runtime performance can continually improve as historic metrics are collected. In step 160, if more dispatches associated with the executable code are available for processing, the method can return to step 110, else continue to step 165. In step 165, execution of executable code can be terminated.

It should be appreciated that the disclosed steps of method 100 should not be construed to limit the invention in any regard. Method 100 can be performed continuously and in real-time permitting each executable code to be dynamically optimized as application server resource availability fluctuates. However, to avoid over optimization of dispatches which can decrease performance, each request can be optionally statically determined by the method 100. In one embodiment, method 100 can be performed at intervals allowing computing resources to be minimized.

Figure 2:
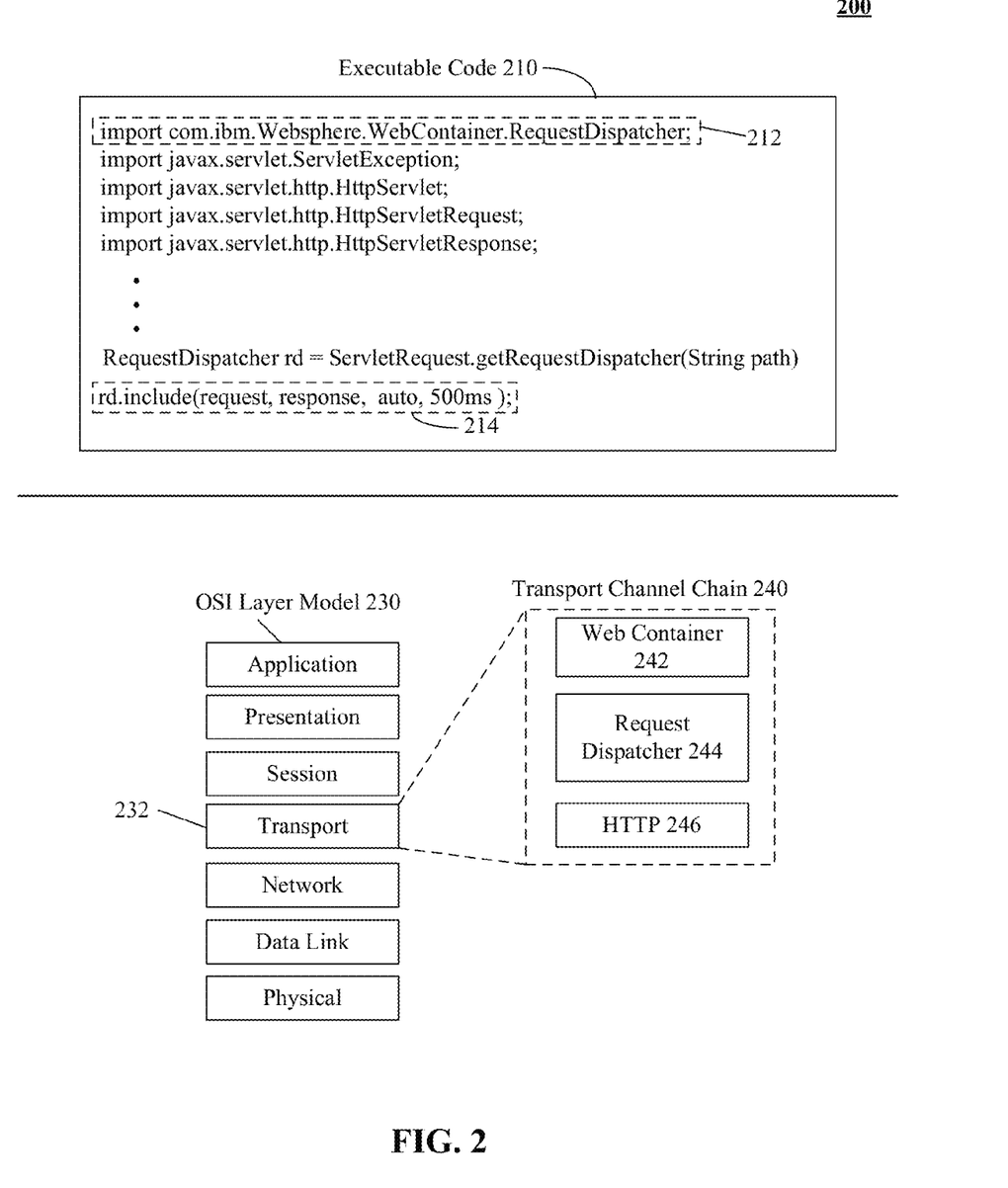
FIG. 2 is a block diagram illustrating an executable code segment and communication model for programmatically determining an execution mode for a request dispatch utilizing historic metrics in accordance to an embodiment of inventive arrangements disclosed herein.

FIG. 2 is a block diagram illustrating an executable code segment 210 and communication model 230 for programmatically determining an execution mode for a request dispatch utilizing historic metrics in accordance to an embodiment of inventive arrangements disclosed herein. In one instance, executable code segment 210 can be a JAVA source code file. Other types of segments 210 can be utilized herein that are based on other (non-JAVA) technologies, where a JAVA based example has been used herein for expressing a concept that is to be construed as independent of any specific implementation language. In executable code segment 210, a request dispatch application programming interface (API) 212 can permit a request dispatch to be automatically executed in an optimized manner based on one or more conditions including, but not limited to, available resources, performance history, and the like. In one embodiment, API 212 can be a wrapper class encapsulating an existing request dispatcher. In another embodiment, API 212 can be a "drop-in" replacement to traditional request dispatchers. That is, existing executable code can remain unmodified while gaining performance benefits of the API 212. In one embodiment, a request dispatcher 244 can be a component of a transport channel chain 240 permitting transparent, dynamic mode execution of a request dispatch.

Utilizing API 212, an application developer can permit a request dispatch 214 to be processed in an optimally execution mode at runtime based on available computing resources. In one embodiment, API 212 can be a component of an IBM WEBSPHERE Web container platform. For example, an application developer can access request dispatch functionality through one or more import directives (e.g., "import com.ibm.Websphere.Webcontainer.RequestDispatch"). Request dispatch 214 can include one or more parameters to allow customization of execution. In one embodiment, arguments (e.g., auto, 500 ms) can permit an application developer to control a portion of the request dispatch behavior. Further, API 212 can permit functionality to natively manage and monitor request dispatches allowing developers to maintain control of the execution code and runtime environment.

In one embodiment, a request dispatcher 244 can reside within an Open System Interconnect model 230 transport layer 232. The dispatcher 244 can transparently receive and dispatch HTTP 246 requests to appropriate Web containers 242. As such, dispatcher 244 can function independently from deployed applications and application limitations.

Drawings presented herein are for illustrative purposes only and should not be construed to limit the invention in any regard. In one embodiment, API 212 can be transparent to the application developer such that request dispatch syntax can be identical to traditional syntax. Further, the API 212 can be a component of a base package which provides functionality automatically to a Web application. That is, application developer need not be required to manually import the API 212 functionality.

Figure 3:
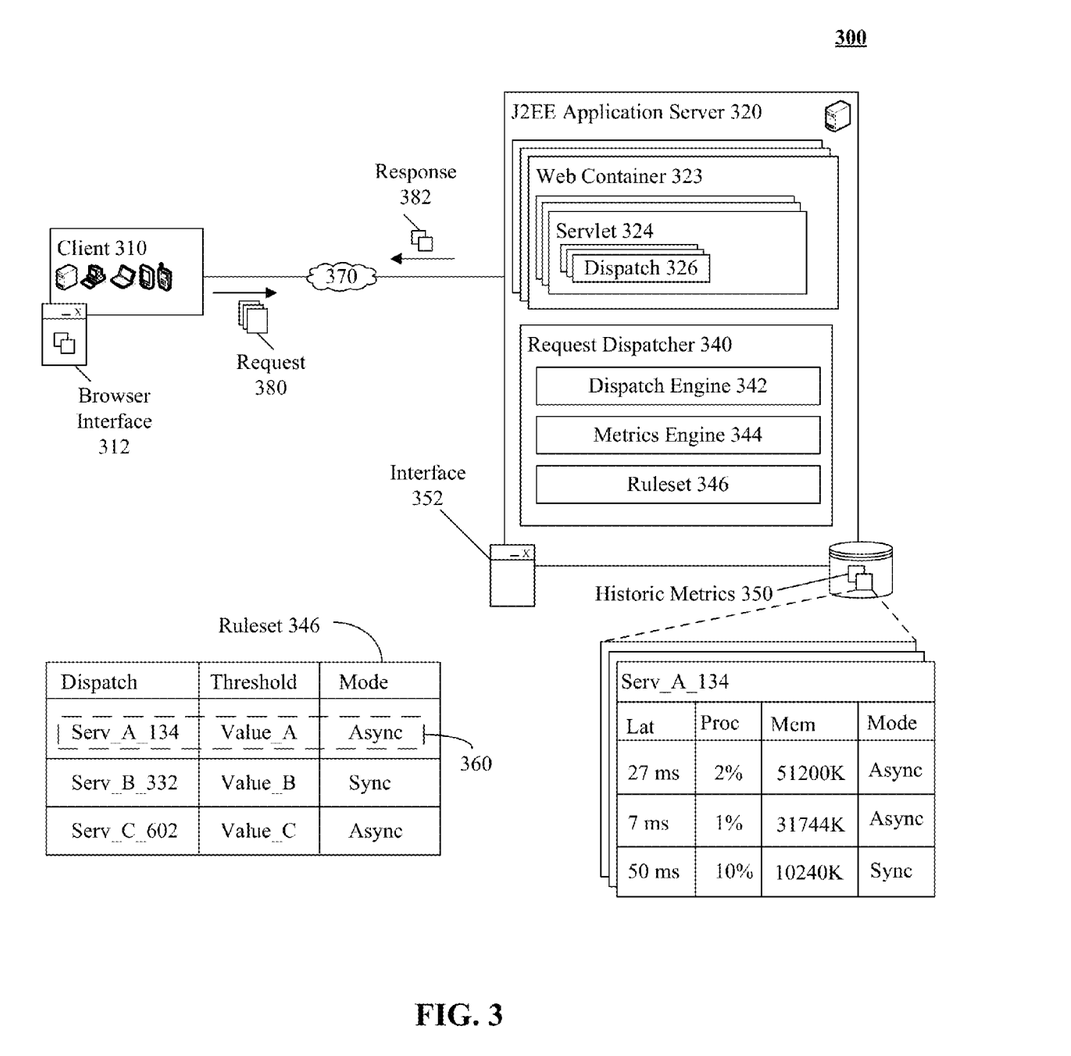
FIG. 3 is a block diagram illustrating a system for programmatically determining a request dispatch execution mode utilizing historic metrics in accordance with an embodiment of inventive arrangements disclosed herein.

FIG. 3 is a block diagram illustrating a system 300 for programmatically determining a request dispatch execution mode utilizing historic metrics in accordance with an embodiment of inventive arrangements disclosed herein. In system 300, a request dispatcher 340 can permit a dispatch 326 associated with a servlet 324 to be executed in an automatically determined mode. The programmatically determined mode can be a synchronous execution mode and an asynchronous execution mode. In one embodiment, the automatically determined execution mode can be performed in a traditional manner. That is, no change in dispatch behavior and/or overhead is required to enable dispatcher 340 functionality. In one embodiment, engine 342 can automatically determine an execution mode for a subsequent execution of the request dispatch 326. As such, each instance of the dispatch 326 can execute in a synchronous or asynchronous mode, responsive to server 320 resource availability.

As used herein, each servlet 324 can be associated with one or more executable resources via a request dispatch 326. Servlet 324 can execute within a Web container 323 of a JAVA 2 ENTERPRISE EDITION (J2EE) application server 320 (or other type of server in other contemplated embodiments). Web container 323 can be a dynamic runtime environment, such as a JAVA VIRTUAL MACHINE runtime environment. For example, servlet 324 can be a Web application which can present Web-based content (e.g., Web pages) to a requesting client 310 within a browser interface 312. Each request dispatch 326 can be associated with a unique identification value such as a process ID or a unique key and/or a resource identifier (e.g., Uniform Resource Locator). In one embodiment, the unique key can be an automatically generated value (e.g., by dispatch engine 342) or a manually determined value. In one instance, the unique identification value can be stored as an annotation (or even a source code comment), which can be extracted during compile-time.

Servlet 324 can receive a request 380 which can trigger the execution of a request dispatch 326. When a request dispatch 326 is encountered by runtime environment 323, the dispatch 326 can be analyzed to determine which resource to execute based on a user specified resource identifier. In one embodiment, dispatcher 340 can negotiate the execution of the specified resource with another runtime environment such as servlets executing in different Web containers.

Request dispatcher 340 can uniquely identify and execute dispatch 326 based on one or more rules 346 and/or settings. That is, dispatcher 340 can be configured to adapt to server 320 resource availability (e.g., server load). Request dispatcher 340 can include dispatch engine 342, metric engine 343, performance monitor 344, rules 346, and interface 352. In one embodiment, dispatcher 340 can be a pluggable extension to Web container 323. Settings 348 can be a user established setting or an automatically determined setting. For instance, default timeout values for dispatches can be dynamically determined based on servlet 324 performance.

Dispatch engine 342 can process dispatch 326 and programmatically determine a suitable execution mode using historic metrics 350. Engine 342 can be responsible for identifying and/or executing local and remote resources associated with dispatch 326. In instances where resource processing is performed remotely, engine 342 can forward the request to the remote processor where the processing can be performed. In instances where resource processing is performed locally, engine 342 can manage the request dispatch 326.

Metrics engine 343 can collect historic metrics associated with servlet 324 and/or dispatch 326. For instance, metrics can be collected at the servlet 324 level permitting high level metrics to be obtained. In one instance, metrics engine 343 can collect metrics in real-time or near real-time. For example, engine 343 can be configured to track the last X number of dispatches 326 over the last Y seconds, where X and Y is user configurable. Further metrics engine 343 can be used to monitor real-time performance of Web container 323, which can be presented via interface 352.

Historic metrics 350 can include resource information such as latency, execution mode, and memory usage. Historic metrics 350 can be associated with each dispatch 326 execution. In one embodiment, metrics for each mode (e.g., asynchronous and synchronous) can be computed enabling evaluation of an aggregate metric for each mode. In this manner, engine 343 can compute a suitable execution mode for the dispatch 326 prior to execution. In another embodiment, metrics 350 associated with dispatch 326 can be aggregated together and evaluated against a threshold value (e.g., rule 360) in ruleset 360. For instance, the memory cost associated with an asynchronous execution can be compared to a memory quota value (e.g., threshold value) to determine if the overhead of an asynchronous execution is an optimal choice. In another instance, the time overhead for setting up/destroying an asynchronous context can be compared against a previously established threshold to determine which mode (asynchronous or synchronous) should be used.

Ruleset 346 can comprise of one or more arbitrarily complex rules for determining the execution mode of a dispatch 326. Ruleset 346 can be user established and/or can be heuristically determined. In one embodiment, multiple metrics can be evaluated together to determine an execution mode. Ruleset 346 can include, but is not limited to, a threshold value, an execution mode, and an event handler associated with the request dispatch, and the like. For instance, the threshold value can be a user established setting or an automatically determined value. Ruleset 346 can further specify the type of aggregation to be used (e.g., server-side vs. client-side) which can be used to prepare request 382. When dispatch 326 execution is complete, request 382 can be generated and conveyed to client 310 via network 370.

Drawings presented herein are for illustrative purposes only and should not be construed to limit the invention in any regard. System 300 can be one or more components of a distributed computing environment, network computing environment, Service Oriented Architecture (SOA), and the like. In one embodiment, system 300 can be one or more components of an IBM WEBSPHERE APPLICATION SERVER. In another embodiment, system 300 can include one or more components of a .NET framework (or any other framework that permits resources to be included for purposes described herein).

Figure 4:
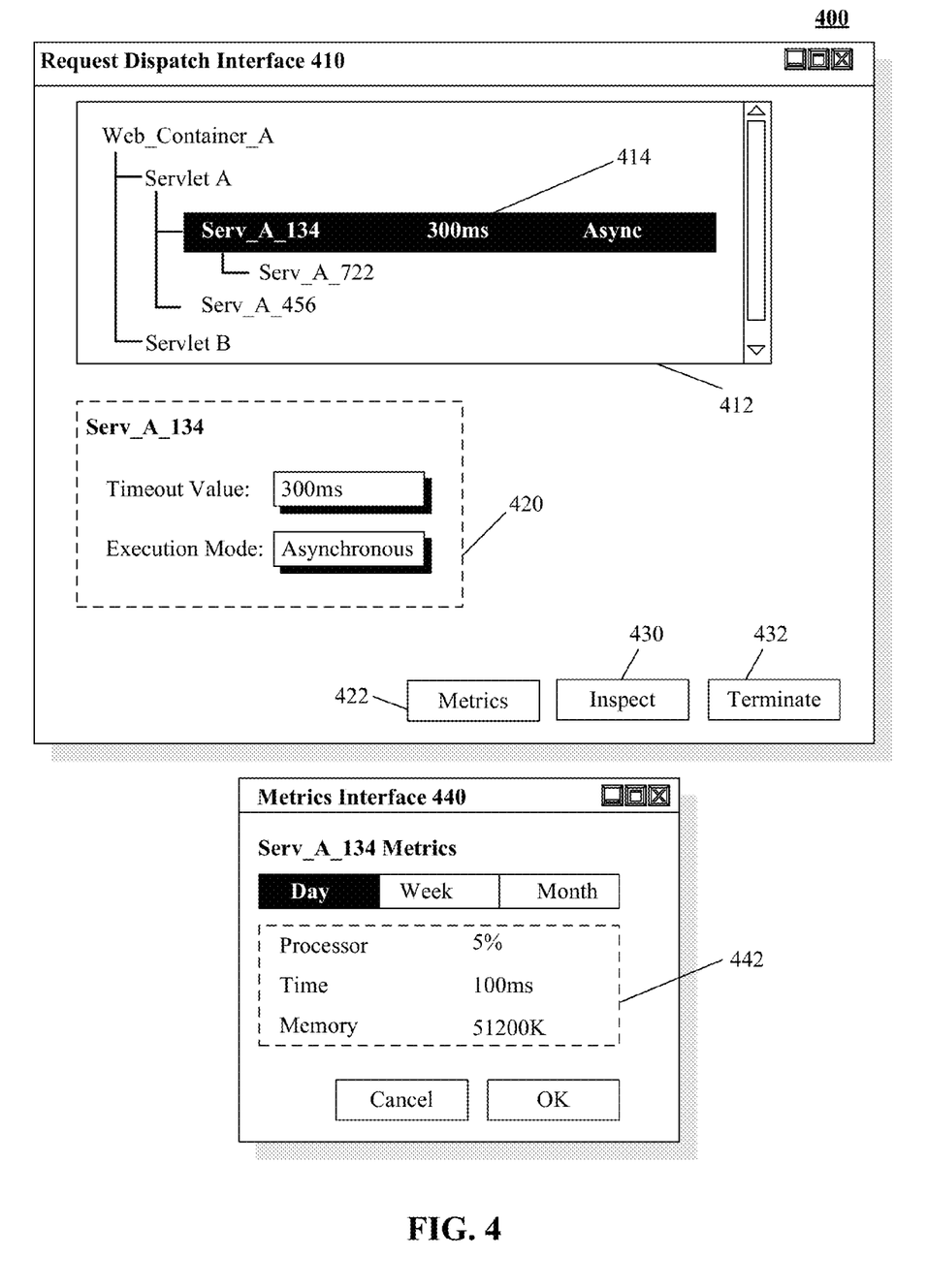
FIG. 4 is a block diagram illustrating a set of interfaces for programmatically determining an execution mode for a request dispatch utilizing historic metrics in accordance with an embodiment of inventive arrangements disclosed herein.

FIG. 4 is a block diagram illustrating a set of interfaces 410, 430 for programmatically determining an execution mode for a request dispatch utilizing historic metrics in accordance with an embodiment of inventive arrangements disclosed herein. Interfaces 410, 430 can be presented in the context of system 300. In interface 410, request dispatches associated with one or more Web applications executing within Web containers can be presented in section 412. Web applications can be one or more executable code entities, such as JAVA servlets, JAVA SERVER PAGES (JSP), and the like. In interface 440, metrics associated with request dispatch 412 can be presented.

In one embodiment, presentation of request dispatches and metrics 442 can occur in real-time, enabling execution snapshots to be obtained readily.

Interface 410 can permit management of one or more executing request dispatches and dependent request dispatches. Interface 410 can include sections 412, 420 and interactive interface elements 422, 430, 432. In interface 410, information associated with a request dispatch 414 can be presented within section 412. Request dispatch information can include, but is not limited to, process ID, execution duration, execution mode, and the like. For instance, section 412 can present each request dispatch and dependent dispatch associated with a Servlet A. In one embodiment, an administrator can selectively manage groups of request dispatches. Interface 410 can present additional information such as active rules, performance metrics, and the like.

Information associated with a selected request dispatch 414 can be presented in section 420. For instance, interacting with interface element 430 can present information associated with the dispatch request. In one instance, section 420 can permit modification of request dispatch values such as timeout values, execution mode, and the like. That is, real-time manual optimization of request dispatches can be achieved when automated optimization prove unsuccessful. In one embodiment, interface 410 can permit thread management capability. For instance, interface element 432 can allow a selected request dispatch to be terminated. Interaction with interface element 422 can present inspection interface 440.

Interface 440 can include section 442 which can present metrics associated with a selected request dispatch 414. Section 442 can include historic metrics such as processor usage, execution duration, and memory usage. For instance, section 442 can present the average resource load of a request dispatch using collected historic metrics. In one embodiment, the historic metrics can be presented in multiple levels of granularity. For example, historic metrics can be presented based on increments of day, week, month, and the like.

Drawings presented herein are for illustrative purposes only and should not be construed to limit the invention in any regard. In one embodiment, interfaces 410, 440 can be one or more screens of a JAVA 2 ENTERPRISE EDITION optimization tool. In another embodiment, interfaces 410, 440 can be a component of an integrated development environment (IDE). Interfaces 410, 440 can be a graphical user interface (GUI), a voice user interface (VUI), multi-mode interface, and the like. Interface elements associated with interfaces 410, 440 can include, but is not limited to, interactive buttons, drop down menus, radio selection elements, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
a computing device, initializing an executable code;
the computing device, identifying a request dispatch associated with the executable code, wherein the request dispatch is processed during a future execution subsequent to the execution of the executable code;
the computing device determining a performance metric associated with the request dispatch, wherein the determining is based on one or more historic performance metrics that are recorded during a previous execution of the request dispatch, wherein the performance metric is at least one of execution frequency, processor load, memory usage, network input/output, number of dependent dispatches information associated with the historic execution of the request;
the computing device comparing the performance metric with a predetermined threshold value;

the computing device, when the performance metric fails to exceed the predetermined threshold value, executing the request dispatch synchronously; and the computing device, when the performance metric exceeds the predetermined threshold value, executing the request dispatch asynchronously.

2. The method of claim 1, wherein the first and second executable code reside within a component of a Web container.

3. The method of claim 1, wherein the request has a corresponding identification value, wherein the identification value identifies the second executable code.

4. The method of claim 1, wherein the execution mode of the first and second executable code is able to be dynamically adjusted during a subsequent execution.

5. The method of claim 1, said determining of the execution mode further comprising:

the computing device building the performance metric using historical data of requests and at least one of their execution frequency, processor load, memory usage, network input/output, number of dependent dispatches information.

6. The method of claim 1, the executing of the request dispatch further comprising:

the computing device toggling a mode setting associated with the request dispatch from a first execution mode to a second execution mode responsive to the execution performance of the request.

7. The method of claim 1, wherein the performance metric is at least one of timing information associated with the historic execution of the request.

8. The method of claim 1, further comprising:

the computing device programmatically collecting at least one performance metric associated with a request dispatcher during the executing of the request, wherein the performance metric is a resource allocation value.

9. The method of claim 1, further comprising:

the computing device transparently encapsulating the functionality of an existing dispatch API, wherein the existing dispatch API executes a request in a synchronous execution mode, wherein the encapsulation permits the request to be executed asynchronously or synchronously.

10. The method of claim 1, wherein the request is a dispatch request associated with the first executable code, wherein a dispatch engine of the computing device identifies the request dispatch, wherein the dispatch engine is a component of a transport channel chain within a runtime environment, wherein the transport chain is associated with a transport layer of an Open System Interconnect (OSI) layer model, said method further comprising:

the computing dispatch executing a ruleset to determine whether the second executable code is executed synchronously or asynchronously, wherein the ruleset is configured to establish at least one of a threshold value, an execution mode, and an event handler with the request dispatch; and the computing device using the request dispatch to trigger execution of the second executable code.

11. The method of claim 10, wherein the request dispatch is associated with a unique identification value, wherein the unique identification value is at least one of an automatically generated unique identification value, a Uniform Resource Identifier (URI), a unique path value, and a unique query string.

12. A computer program product comprising a non-transitory computer readable storage medium having computer usable program code embodied therewith, the computer usable program code comprising:

computer usable program code stored in a non-transitory storage medium operable to initialize an executable code;

computer usable program code stored in a non-transitory storage medium operable to identify a request dispatch associated with the executable code, wherein the request dispatch is processed during a future execution subsequent to the execution of the executable code;

computer usable program code stored in a non-transitory storage medium operable to determine a historic performance metric associated with the request dispatch, wherein the determining is based on one or more historic performance metrics that are recorded during a previous execution of the request dispatch, wherein the performance metric is at least one of execution frequency, processor load, memory usage, network input/output, number of dependent dispatches information;

computer usable program code stored in a non-transitory storage medium operable to compare the historic performance metric with a predetermined threshold value;

computer usable program code stored in a non-transitory storage medium operable to, when the performance metric fails to exceed the predetermined threshold value, execute the request dispatch synchronously; and computer usable program code stored in a non-transitory storage medium operable to, when the performance metric exceeds the predetermined threshold value, execute the request dispatch asynchronously.

13. The computer program product of claim 12, wherein the first and second executable code resides within a component of a Web container.

14. The computer program product of claim 12, further comprising:

computer usable program code stored in a tangible storage medium operable to identify at least one performance metric associated with the request dispatch, wherein the performance metric is a historic metric, wherein the historic metric is a statistical value indicating at least one property of the historic execution of the request dispatch.

15. The computer program product of claim 12, further comprising:

computer usable program code stored in a tangible storage medium operable to toggle a mode setting associated with the request dispatch from a first execution mode to a second execution mode responsive to the execution performance of the request dispatch.

16. The computer program product of claim 12, further comprising:

computer usable program code stored in a tangible storage medium operable to collect at least one performance metric associated with a request dispatcher during the executing of the request dispatch, wherein the performance metric is a resource allocation value.

* * * * *